US 8,737,932 B2

(12) United States Patent
Wang et al.

(10) Patent No.: US 8,737,932 B2
(45) Date of Patent: May 27, 2014

(54) LOAD AWARE POWER CONTROLLING

(75) Inventors: Chun Ye Wang, Beijing (CN); Xiao Yi Wang, Beijing (CN)

(73) Assignee: Nokia Siemens Networks Oy, Espoo (FI)

(*) Notice: Subject to any disclaimer, the term of this patent is extended or adjusted under 35 U.S.C. 154(b) by 57 days.

(21) Appl. No.: 13/143,473

(22) PCT Filed: Jan. 7, 2009

(86) PCT No.: PCT/EP2009/050115
§ 371 (c)(1),
(2), (4) Date: Jul. 6, 2011

(87) PCT Pub. No.: WO2010/078961
PCT Pub. Date: Jul. 15, 2010

(65) Prior Publication Data
US 2011/0275331 A1    Nov. 10, 2011

(51) Int. Cl.
*H04B 1/38* (2006.01)
(52) U.S. Cl.
USPC .... 455/73; 455/422.1; 455/114.2; 455/127.1; 455/127.2
(58) Field of Classification Search
USPC ............. 455/73, 422.1, 114.2, 127.1, 127.2
See application file for complete search history.

(56) References Cited

U.S. PATENT DOCUMENTS

| | | | |
|---|---|---|---|
| 5,095,500 A * | 3/1992 | Tayloe et al. | 379/32.01 |
| 6,347,224 B1 * | 2/2002 | Smyth et al. | 455/406 |
| 7,139,578 B2 * | 11/2006 | An | 455/453 |
| 2006/0019694 A1 * | 1/2006 | Sutivong et al. | 455/522 |
| 2007/0287444 A1 * | 12/2007 | Hulkkonen et al. | 455/422.1 |
| 2009/0325624 A1 * | 12/2009 | Centonza | 455/522 |

FOREIGN PATENT DOCUMENTS

| WO | WO 2004/059874 A1 | 7/2004 |
|---|---|---|
| WO | WO 2006/091172 A1 | 8/2006 |

OTHER PUBLICATIONS 802.16-2004, "IEEE Standard for Local and Metropolitan Area Networks—Part 16: Air Interface for Fixed Broadband Wireless Access Systems", Jun. 24, 2004, (893 pages).
R1-060401, 3GPP TSG RAN 1 #44, "Interference Mitigation via Power Control and FDM Resource Allocation and UE Alignment for E-UTRA Uplink and TP", Motorola, Denver, Colorado, Feb. 13-17, 2006, 6 pgs.
R1-070251, TSG-RAN WG1 #47bis, "Power Control of Uplink Shared Data Channel", LG Electronics, Sorrento, Italy, Jan. 15-19, 2007, 5 pgs.
R1-071716, 3GPP TSG-RAN WG1 #48-bis, "Fractional Power Control using Pilot Power Ratio Measurements for the E-UTRA Uplink", Alcatel-Lucent, St. Julians, Malta, Mar. 26-30, 2007, 10 pgs.
R1-063231, 3GPP TSG RAN WG1 Meeting #47, "Uplink Power Control for EUTRA: Optimizing theTrade-off between Cell-Edge and Cell-Average Throughputs", Texas Instruments, Riga, Latvia, Nov. 6-10, 2006, 7 pgs.
R1-062861, TSG-RAN WG1 #46bis, "Uplink Power Control for E-UTRA", Ericsson, Seoul, Korea, Oct. 9-13, 2006, 5 pgs.

(Continued)

*Primary Examiner* — Sanh Phu
(74) *Attorney, Agent, or Firm* — Harrington & Smith

(57) ABSTRACT

A User Equipment Apparatus is described, which include a Load Factor Determining Device and a Calculating Device. The Load Factor Determining Device is adapted for determining at least one load factor value of a neighbor sector. The Calculating Device is adapted for calculating a transmit power of the User Equipment Apparatus such that the at least one load factor value of a sector is considered.

13 Claims, 5 Drawing Sheets

(56) References Cited

OTHER PUBLICATIONS

R1-060297, 3GPP TSG RAN WG1 #44 Meeting, "Uplink Power Control", Nokia Denver, Colorado, Feb. 13-17, 2006, 2 pgs.

802.16e-2005, "IEEE Standard for Local and Metropolitan Area Networks—Part 16: Air Interface for Fixed Broadband Wireless Access Systems", Feb. 28, 2006, (864 pages).

IEEE 802.16m System Description Document, Dec. 12, 2008, (163 Pages).

* cited by examiner

FIG 8 

FIG 8A

| Syntax | Size | Notes |
| --- | --- | --- |
| PBCH Information { | | |
| Superframe number | 8 bits | |
| SBCH Size | 3 bits | The SBCH size in unit of LRU. [Note: The meaning of the values (000-111) are FFS.] |
| Duplex mode | 1 bits | 0:TDD<br>1:FDD, HFDD |
| If (Duplex mode==0) { | | |
| TTG | 2 bits | TTG size in the unit of OFDM symbols.<br>00: no TTG.<br>01:1 OFDMA symbol for TTG<br>10:2 OFDMA symbols for TTG<br>11: Reserved |
| DL/UL ratio | 3 bits | 000: 4 DL subframes: 4 UL subframes<br>001: 5:3<br>010: 6:2<br>011: 7:1<br>100: 8:0<br>others: Reserved |
| } else { | | |
| UL central Frequency | 5 bits | Paired UL central frequency |
| } | | |

FIG 8B

| | | |
|---|---|---|
| DL bandwidth | 2 bits | 00:5 MHz<br>01:10 MHz<br>10:20 MHz<br>11: Reserved<br>[Notes: Whether to indicate 7 and 8.75 MHz is FFS.] |
| PHY configuration counter | 4 bits | Whenever PHY configuration changed, this counter should ++<br>Could be common in whole network |
| Paging information presence | 1 bit | Indication of the paging information presence in the channel of SBCH. |
| Traffic indication presence | 1 bit | Indication of the traffic indication presence in the channel of additional broadcast information. |
| Load factor of neighboring sectors | 8 bits | To indicate the load factor of neighboring sectors. Suppose current sector index is i. (sector index within one cell, indexed from 0-2)<br>the first 4 bits indicate the load factor of sector [i+1] mod 3<br>the last 4 bits indicate the load factor of sector [i+2] mod 3 |
| PBCH CRC | 16 bits | |
| } | | |

LOAD AWARE POWER CONTROLLING

TECHNICAL FIELD OF THE INVENTION

The present invention relates to the technical field of communication networks. In particular the present invention relates to mobile communication, to a User Equipment Apparatus, to a Network Apparatus, to a method for determining a transmit power for load awareness power control of a User Equipment Apparatus, to a method for providing a load factor of a sector for load awareness power control, to a program element and to a signal sequence.

BACKGROUND OF THE INVENTION

In an OFDM (Orthogonal Frequency Division Multiplex) based wireless communication system, such as IEEE 802.16m the uplink power control can be an issue for the overall system performance and for battery life of a Mobile Station (MS). In the uplink direction multiple orthogonal resource units or sub-carriers may be defined in the frequency domain based on OFDM as may be described in IEEE 802.16m.

In the document IEEE 802.16m, System Description Document, "IEEE 802.16 Broadband Wireless Access Working Group", 2008-12-12, a system description may be provided for a further development of the IEEE 802.16m System Description.

The document IEEE 802.16e-2005 and IEEE 802.16-2004, "IEEE Standard for Local and Metropolitan Area Networks—Part 16: Air interface for fixed broadband wireless access systems, Amendment 2: Physical and Medium Access Control Layers for Combined Fixed and Mobile Operation in Licensed Bands and Corrigendum 1," Feb. 28, 2006 may describe supporting subscriber stations moving at vehicular speeds and thereby may specify a system for combined fixed and mobile wireless access.

The document 3GPP TSG RAN1 #44, R1-060401, "Interference mitigation via power control and FDM resource allocation and UE alignment for E-UTRA uplink and TP", Agenda item 13.2.3.6, Motorola, February 13-Feb. 17, 2006, Denver, USA, may disclose a fractional power control scheme with FDM resource allocation for E-UTRA uplink and simulation results.

The document 3GPP TSG RAN WG1 #46bis, R1-062861, "Uplink power control for E-UTRA (Evolved UMTS (Universal Mobile Telecommunications System) Terrestrial Radio Access)", Agenda item 6.8, Oct. 9-13, 2006, Seoul, Korea, may describe a power control mechanism controlling the power spectral density.

The document 3GPP TSG RA1 WG1#44 meeting, R1-060297, "Uplink power Control", Agenda item 13.2.3.4, Nokia, 13-17 February, 2006, Denver, USA, may disclose deriving an initial transmission power according to a path loss measurement from a downlink pilot channel during a random access phase.

The document 3GPP TSG RAN WG1 #47bis, R1-070251, "Power control of uplink shared data channel", LG Electronics, Agenda item 6.12, Jan. 15-19, 2007, Sorrento, Italy, may describe a modified fractional power control scheme.

The document 3GPP TSG-RAN WG1 #48-bis, R1-071716, "Fractional power control using pilot power ratio measurements for the E-UTRA uplink", Agenda item 7.6, Alcatel-Lucent, Mar. 26-30, 2007, St. Julians, Malta, may describe open loop fractional power control using the path loss difference between serving cell and a strongest neighbour cell.

The document 3GPP TSG RAN WG1 meeting #47, R1-063231, "Uplink power control for E-UTRA: Optimizing the trade-off between cell-edge and cell-average throughputs", Agenda item 6.9, Texas Instruments, Nov. 6-10, 2006, Riga, Latvia, may disclose a base line power control method.

There may be a need to provide a more efficient power control.

SUMMARY OF THE INVENTION

According to an exemplary embodiment of the present invention, a User Equipment Apparatus, a Network Apparatus for maintaining a sector, a method for determining a transmit power for load awareness power control for a User Equipment Apparatus, a method for providing a load factor of a neighbour sector for load awareness power control, a program element and a signal sequence may be provided.

According to another exemplary embodiment of the present invention, a User Equipment Apparatus may be provided, wherein the User Equipment Apparatus may comprise a Load Factor Determining Device and a Calculating Device. The Load Factor Determining Device may be adapted for determining at least one load factor value of a neighbour sector.

The Calculating Device may be adapted for calculating a transmit power of the User Equipment Apparatus such that the at least one load factor value of the neighbour sector may be considered, regarded, incorporated or included.

According to another exemplary embodiment of the present invention, a Network Apparatus for maintaining a sector, a cell and/or a site may be provided, wherein the Network Apparatus may comprise a Sector Load Factor Determining Device and a Transmitting Device. The Sector Load Factor Determining Device may be adapted for determining at least one load factor value for the sector. In an example, the sector may be maintained or generated by the Network Apparatus. The Network Apparatus may also administrate the site or the sector. In another example, the Network Apparatus may maintain or administrate a plurality of sectors, sites or cells.

The Transmitting Device may be adapted for transmitting the at least one load factor value, e.g. in a broadcast channel. In an example, the load factor value may be transmitted or provided to a User Equipment Apparatus, to a user equipment, to a UE, to a Mobile Terminal (MT), to a Mobile Station (MS) or to a user terminal.

The sector, which may be maintained by the Network Apparatus can for example be a site, a cell, a radio controlled cell and/or a mobile communication cell, e.g. a sector illuminated by an antenna, wherein the antenna may be driven by the Network Apparatus. In an example, the sector may be defined by a footprint or the sector may be generated by transmitting radio signals from the Network Apparatus via an antenna. In a particular example, for an omni antenna, the sector may correspond to a site or to a cell.

According to another exemplary embodiment of the present invention, a method for determining a transmit power for load awareness power control of a User Equipment Apparatus may be provided. This method may comprise determining at least one load factor value of a neighbour sector, of another sector or of a co-site sector and calculating a value for the transmit power of the User Equipment Apparatus such that the at least one load factor value of the neighbour sector may be considered.

In an example, the neighbour sector may be a sector in a neighbour site or co-site sector. Thus, the User Equipment Apparatus may be able to calculate the impact to communication connections in other sectors than the sector in which the User Equipment apparatus may be located.

The load factor value may be a value, describing an actual load in a sector, in a site or in a cell of a Network Apparatus, in particular in a neighbour sector. In an example, the load factor may be the number of MSs in a sector, maintained by a Network Apparatus. In another example, the load factor may be proportional to the number of MSs located in the sector.

According to another exemplary embodiment of the present invention a method for providing a load factor of a sector for load awareness power control may be provided. The method may comprise determining at least one load factor value for the sector and transmitting the at least one load factor value.

According to another exemplary embodiment of the present invention, a program element may be provided, which program element, when being executed by a processor, may be adapted to carry out at least one of the method for determining a transmit power for load awareness power control and the method for providing a load factor of a sector for a load awareness power control or a load aware power control.

According to yet another exemplary embodiment of the present invention, a computer-readable medium may be provided, wherein the computer-readable medium may comprise a program code, which when being executed by a processor may be adapted to carry out at least one of the method for determining a transmit power for load awareness power control and the method for providing a load factor of a sector for load awareness power control.

A computer-readable medium in an example may be a floppy disk, a harddisk, an USB (Universal Serial Bus) storage device, a RAM (Random Access Memory), a ROM (Read Only Memory) or an EPROM (Erasable Programmable Read Only Memory). A computer-readable medium may also be a data communication network, e.g. the Internet, which may allow downloading the program code.

According to another exemplary embodiment of the present invention, a signal sequence may be provided, wherein the signal sequence may be adapted for transmitting a load factor value between a User Equipment Apparatus and a Network Apparatus.

The signal sequence in an example may be a modulation scheme of a radio transmission signal, wherein the modulation scheme may be adapted such that a receiver of the signal sequence can identify information transmitted by the signal sequence as a load factor value information for load aware power control or for load awareness power control. The receiver may detect a load factor value using a pattern of a defined message format. The signal sequence may comprise a message and the message may have a message format, which may allow a receiver to identify the load factor value transmitted by a sender within the signal sequence.

The sender in an example may be a Network Apparatus and the receiver may be an user equipment. In another example, a broadcast message may be utilized to transmit a load factor value.

A User Equipment Apparatus may be a mobile user equipment, such as an MS, a cell phone, a mobile phone, a laptop, a PDA (Personal Digital Assistant), a PC (Personal Computer) and a smart phone.

An MS may cause to other MSs interference, which may be located within neighbour sites or neighbour sectors to the sector to which the MS is connected to. The interference, may depend on the number of MSs located in the neighbour sector. The neighbour sector may be the footprint of another Network Apparatus than the sector of The Network Apparatus, to which the MS may be connected. In an example, a Network Apparatus may be a base transceiver station (BTS). A BTS may drive or maintain a sector.

A cell may comprise a plurality of different sectors, which may be driven by different BTS. In an example, a Base Station (BS) may comprise three BTSs corresponding to three sectors.

In another example, the three sectors may be arranged such, that each sector may cover substantially an angle of 120°. Such an arrangement may also be known as a Mercedes Star arrangement. In the example of three sectors, the MS may be located in one of the three sectors, wherein the other of the three sectors may be the co-site sectors. Without limiting the scope of the present invention to a cell comprising three sectors, in an exemplary embodiment of the present invention a three sector cell may be provided.

If neighbour sectors are driven by the same Network Apparatus, the neighbour sectors may be co-site sectors.

In another example the neighbour sector can be driven by different BSs, which may be far away from the MS.

Each sector may have an individual cell identifier, for example a preamble. This identifier may be transmitted by the BTS or by the BS, which generates or maintains the corresponding cell. By receiving a corresponding identifier or cell identifier, the MS may know the origin of the corresponding message and thus may know, which sectors are co-site sectors. The MS may also know to which sector the MS may be connected.

The sector, to which the MS may be connected may be the serving sector, the serving site, the serving BS or the serving BTS.

A load factor or load factor value in an example may be indicated by a Greek letter, such as $\alpha$ or $\beta$. The load factor may be determined by every BTS or by every sector. The load factor or load factor value may determine the load of the corresponding sector. In an example, the load of a sector may be the number of MSs connected to a BTS, which may maintain the corresponding sector. In another example a load factor can be at least one of the group consisting of an occupation rate, a resource, such as a sub-carrier or a frequency of an OFDM system and the number of used resources of a plurality of a resource.

The occupation rate may be defined as the used PHY (physical) resource divided by totally available PHY resources. All the numbers may averaged at time dimension. Thus, the values for the occupation rate may be average values or statistical values. Therefore, the load factor values may be statistical load values.

In an example the occupation rate may be the number of used resources in relation to the available resources.

In another example in a sector may be ten resources available and seven resources may be used and therefore an occupation rate of 0.7 is available in that sector.

Thus, it may be seen as an aspect of the present invention to consider the load information of neighbouring sectors in an Open Loop Power Control (OLPC). In an example an MS A may be connected to a (serving) sector A and an MS B may be connected to a sector B. In other words, the MS A may be associated with a corresponding BTS A and MS B may be associated with a corresponding BTS B. Sector A and sector B may be maintained by different BTSs. Thus, transmitting data in the uplink from MS A to BTS A may influence or may interfere with the uplink connection of MS B to BTS B if MS A and MS B transmit data at the same time.

If a reuse factor of 1 may be used, MS A and MS B may use the same resources. Therefore, the transmission of data from MS A to BTS A may have an impact to the transmission of data from MS B to BTS B. The direction from the MS to the BS may be an uplink direction. In an example, a reuse factor of 1 may be desired, in order to efficiently use the available resources. By using a reuse factor of 1, limitation of reusing frequencies of different resources may be prevented. However, using a reuse factor of 1 or using the same resources for different uplink connections may increase the probability of interfering of the different data connections. In an example the same resources may interfere with one another. Therefore, some resources may not be used or may substantially only be limited used.

By providing load factor values using the same resources for different data connections or for different uplink data connections may be possible and providing load factor values may help to reduce the risk of interference.

The risk of interference may depend on the number of used resources in one sector or in one cell. Providing load factors may allow an MS to estimate the probability of interference, which interference this particular MS may generate to other data connections. In an example, providing load factors from other sectors or from neighbour sectors, may allow the MS to estimate the influence of an uplink connection between the MS and the BS to the other connections. In other words, if an MS A knows the load factor of a sector B, the MS A may be able to estimate how an uplink connection from MS A to BTS A may influence an uplink connection of MS B to BS B, wherein both uplink connections may use the same resources.

BTS A and BTS B may substantially not be able to communicate in real time with one another in order to exchange or coordinate scheduling information of the common resources. Scheduling information may include information about resources allocated by the BTS to corresponding connections. Thus, substantially no real-time communication between different BTSs, e.g. BTS A and BTS B may be available. Therefore, different BTSs, such as BTS A and BTS B may substantially not know the scheduling of one another.

OFDM may allow allocating a plurality of resources or resource blocks for a data communication. A resource block in OFDM may be a sub-carrier. However, if for example BTS A and BTS B may allocate the same resources at the same time, the probability of interference may be increased without having a possibility to coordinate BTS A and BTS B. Thus, by providing the load factor to corresponding MS, the MS may be able to control the used power for the uplink in a way to decrease the probability to influence another connection using the same resources. This principle may allow using a reuse factor of 1. Furthermore, a more efficient reuse of available resources, substantially without real-time coordination of scheduling of the resources between the BTSs may be possible.

The load factor may be a long-term statistic value indicating the probability that resources in a sector may be occupied. The MS receiving such load factor may be able to determine a power spectrum density such that a target noise rise level (NRT) and a noise value may be regarded. Furthermore a path gain corresponding to each load factor may be regarded.

In an example of a cell comprising three sectors an equivalent path gain g may be calculated according to $$g = \alpha 10^{\wedge}\left(\frac{g_1}{10}\right) + \beta 10^{\wedge}\left(\frac{g_2}{10}\right) + \sum_{k=3}^{\infty} 10^{\wedge}\left(\frac{g_k}{10}\right)$$

In a particular example, the path gains to co-site sectors gi (g1 and g2) may be limited to the number of sites which may be seen by the MS, for example from which sites the MS receives a corresponding preamble. The number of visible sites in an example may be 2. Therefore, g1 and g2 may be calculated.

In particular g1, g2 are path gains to co-site sectors of the serving sector.

In a particular example, co-site sectors may be defined as sectors which may share the same BS as the serving sector. Such sectors may form a particular kind of neighbouring sectors, the so called co-site sectors.

In other words, in the particular example three sectors may exist in a cell, sector 0, 1 and 2. The MS may be located in sector 0, the serving sector. Therefore, sectors 1 and 2 may be co-site sectors of serving sector 0. α may be the load factor broadcasted by BTS 1 or by the Network Apparatus of sector 1 and β may be the load factor broadcasted by sector 2. α and β may be the load information of two co-site sectors (or neighbouring sectors) on a particular frequency band, e.g. in the same frequency band.

In another example, there may be three co-site sectors A, B, C available. α may be the load information of sector B and β may be the load information of sector C. In this example, sector A may be the serving sector, to which the MS may be connected.

In interference constraint power control (ICPC) in order to decide or to determine the MS Tx power (Transmit Power), e.g. the transmit power in uplink direction may be calculated with formula:

$P=NRT+N-g$, wherein g may be the equivalent path gain $$g = \sum_{i=1}^{\infty} g_i$$

This equivalent path gain however may not consider the load factor value. Therefore, for load aware ICPC, the formula $P=NRT+N-g$ may be adapted such that g may be the equivalent path gain calculated according to the formula $$g = \alpha 10^{\wedge}\left(\frac{g_1}{10}\right) + \beta 10^{\wedge}\left(\frac{g_2}{10}\right) + \sum_{k=3}^{\infty} 10^{\wedge}\left(\frac{g_k}{10}\right)$$

for a case of two co-site sectors. Since in an example each BS may have 3 sectors, 2 co-site sectors may be considered. In the example of the above mentioned formula there may be many other BSs around the three sectors BS, which also can be considered. Therefore, the sum may be considered as reaching from k=3 to theoretically infinity, i.e. as long as influencing surrounding sectors may be detected.

The general formula for the equivalent path gain for more than 2 sectors may be $$g = \sum_{k=1}^{\infty} n_k \times 10^{\wedge}\left(\frac{g_k}{10}\right)$$

wherein $n_k$ may be the load factor of sector k. The default value of $n_k$ may be 1. Thus, if a preamble may be received however no corresponding load factor value, n may be set to 1. If a load factor value α, β may be received, $n_k$ may be replaced by that value. Even if the formula may use infinity (∞), the number of elements in the sum may be limited by the number of detectable neighbour sectors. Sectors which may be far away may not be regarded.

Generally, g may be calculated by using the load factor values $n_k$ multiplied by ten to the power of the tenth of a corresponding path gain to the corresponding co-site sector. All particular detected load factors may be calculated with the formula load factor*10^(path gain to corresponding sector/10). These terms may be all added or cummulated.

According to another exemplary embodiment of the present invention, the transmit power may be an uplink transmit power.

In an example in the downlink direction (DL, from Network Apparatus to User Equipment Apparatus), the transmitting power may be fixed. Due to the PHY structure of DL, in an example the DL performance may be limited by the number of PHY resource. The UL however may be limited by interference. Thus, in an example power control (PC) may substantially be made in the UL direction. PC may also be made in DL direction.

According to another exemplary embodiment of the present invention, determining at least one load factor may comprise receiving a load factor value.

In an example a predefined message or message format may be used to transmit the load factor value from a BTS to corresponding BS. In an example, different Network Apparatuses or different BTSs may not be able to coordinate scheduling with one another. Thus, providing determined load factors from a BTS to an MS may allow the MS to calculate or estimate the probability of influencing other uplink connections in other cells.

According to yet another exemplary embodiment of the present invention, calculating the transmit power may comprise weighting the path gain to the neighbour sector with a corresponding load factor value.

In other words, a path gain to the neighbour sector or to the co-site sector may be calculated using the at least one load factor value.

If the load factor value of any sector may be known by the MS, the MS may be able to weight the corresponding path gain to the sector with the load factor when performing power control. In another example the path loss to and/or from the sector may be weighted. Path loss may be similarly weighted than a path gain. In an example, path loss may be path gain with inverse prefix or sign.

The path gain to the co-site sectors may allow an MS, which may estimate or which may know that a plurality of neighbouring connections may exist, using a limited power in order to substantially may not interfere with the other uplink connections.

In another example, if an MS may determine that substantially no other co-site sector connections may exist or may only co-site connections using other resources exist, the MS can use a maximum power for the MS uplink connection. Thus, the MS may know that the probability to disturb or interfere with other connections may be low. Otherwise, if the MS may receive a high load factor value from other BS, the MS may know that there may exist a high number of connections in other sectors. Therefore, the MS may know that the probability of disturbing or the probability to interfere with other connections may be high and therefore the MS may use a reduced power for the uplink connection. The load factor values may be used for reducing the transmit power.

According to yet another exemplary embodiment of the present invention, the at least one load factor value may correspond to the average load of the neighbour sector.

The average load may be a measure for the probability of interference. The average load may be calculated from the number of used resources, in particular of used resources of the same frequency, in neighbouring sites or neighbour sectors.

In a particular example, the neighbour sector may be a co-site sector. The co-site sector may be a sector which may share the BS with the serving sector. In other words, the co-site sector may be the sector, which may directly connect to the sector of a cell in which sector the MS may be located, which MS may calculate the transmit power. Thus, the co-site sector may be a direct neighbour to the serving sector.

According to another exemplary embodiment of the present invention, the at least one load factor value may correspond to scheduling information of at least one of a resource block, an OFDM resource block, a sub-carrier and a frequency.

According to another exemplary embodiment of the present invention, the User Equipment Apparatus may be at least one apparatus selected from the group of apparatuses consisting of a GSM (Global System for Mobile communication) user equipment, a UMTS user equipment, a LTE/SAE (Long-Term Evolution/Service Architecture Evolution) user equipment, a Mobile Terminal (MT), a IEEE 802.16m/AMS (IEEE 802.16m Advanced Mobile Station) and a Mobile Station (MS).

According to another exemplary embodiment of the present invention, the Transmitting Device may be adapted for carrying out at least one of transmitting the at least one load factor value to another Network Apparatus, transmitting the at least one load factor value to a mobile station and broadcasting the at least one load factor value.

In other words, in an example, the Transmitting Device may be adapted for transmitting the determined at least one load factor value to another Network Apparatus. In another example, the Transmitting Device may be adapted for transmitting the at least one load factor value to a mobile station. And in still another example, the Transmitting Device may be adapted for broadcasting the at least one load factor value.

By broadcasting other sectors' load factor values to MSs, the MSs may be informed about load factor values of non-serving sectors or neighbouring sectors.

Furthermore, the load factor value of its own sector or the load factor value of the serving sector may be able to be transmitted to other sectors or to other BTSs of other sectors through a backhaul network.

According to another exemplary embodiment of the present invention, the Network Apparatus may use for transmitting the at least one load factor value at least one channel of the group of channels consisting of Broadcast Channel (BCH), a Primary Broadcast Channel (PBCH), a Secondary Broadcast Channel (SBCH), a management channel, a control channel and a backhaul network or a channel in a backhaul network.

By using a broadcast channel, a Network Apparatus may be able to transmit or broadcast on a regular basis load factor values of other sectors as the serving sector to all MS. The Network Apparatus may not know which MS may receive a corresponding load factor information, however using a broadcast channel may allow to reach every MS which may need to know the information. If an MS may not receive the information, the signal may not be strong enough to reach the corresponding MS and therefore interference or the risk of interference may be low and therefore the MS may substantially not need to know about a corresponding load factor.

According to another exemplary embodiment of the present invention, the Network Apparatus may be at least one apparatus selected from a Base Station (BS), a Base Station Transceiver (BTS), a Base Station Controller (BSC), a Radio Network Controller (RNC), a NodeB, an Enhanced NodeB (ENodeB, ENB) and a server.

A server may allow centrally storing and determining load factors and the server may allow in a network comprising a plurality of Base Stations or Base Station Transceivers to coordinate load factors one with another. In an example the MS may substantially only need to connect to a corresponding server in order to determine substantially all load factors interesting for the MS. Thus, the MS may only need to contact the server and may not need to evaluate the load factor values from a corresponding preamble.

According to another exemplary embodiment of the present invention, the signal sequence may comprise at least one of a IEEE 802.16 message, a IEEE 802.16m message, a broadcast channel (BCH) information, a primary broadcast channel information and a secondary broadcast channel information. In particular, this message may be dedicated to the 802.16m BCH.

It has also to be noted that exemplary embodiments of the present invention and aspects of the invention have been described with reference to different subject-matters. In particular, some embodiments have been described with reference to apparatus type claims whereas other embodiments have been described with reference to method type claims. However, a person skilled in the art will gather from the above and the following description that unless other notified in addition to any combination between features belonging to one type of subject-matter also any combination between features relating to different subject-matters in particular between features of the apparatus claims and the features of the method claims may be considered to be disclosed with this application.

These and other aspects of the present invention will become apparent from and elucidated with reference to the embodiments described hereinafter.

Exemplary embodiments of the present invention will be described in the following with reference to the following drawings.

BRIEF DESCRIPTION OF THE DRAWINGS

FIG. 8 shows a message format according to an exemplary embodiment of the present invention.

DETAILED DESCRIPTION

Figure 1:
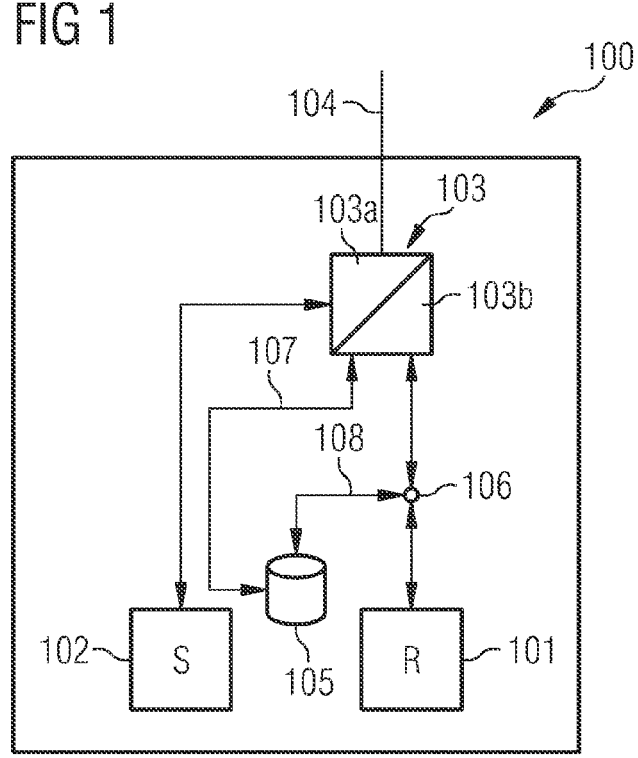
FIG. 1 shows a block diagram of a User Equipment Apparatus according to an exemplary embodiment of the present invention.

The illustration in the drawings is schematic. In different drawings, similar or identical elements are provided with the same reference numerals.

FIG. 1 shows a diagram of a User Equipment Apparatus according to an exemplary embodiment of the present invention.

The User Equipment Apparatus 100, the Mobile Station (MS) 100 or the User Equipment (UE) 100 comprises a Sending Device 102 and a Receiving Device 101. The Sending Device 102 and the Receiving Device 101 are connected by a bidirectional connection to the transceiver 103. The transceiver 103 comprises a sending part 103a and a receiving part 103b. The transceiver 103 has an antenna 104, which allows transmitting and/or receiving data to/from a Network Apparatus, in particular to/from a Base Station (BS). The User Equipment Apparatus 100 comprises a Load Factor Determining Device 106.

The Load Factor Determining Device may be integrated into a receiving stream between receiving part 103b of the transceiver 103 and the Receiving Device 101. The Load Factor Determining Device may allow to filter or to extract received load factor values from a broadcast channel or a control channel, which is received via antenna 104 and transceiver 103. In another example the Load Factor Determining Device 106 is adapted to calculate load factor from field strengths received from co-site sectors or neighbour sectors.

The received power factor values, for example $\alpha$ and/or $\beta$ are transmitted from the Load Factor Determining Device 106 to the Calculating Device 105. The Calculating Device 105 uses the load factor values in order to calculate a power spectrum density (PSD) or a power spectral density. The calculated PSD is used to control via bidirectional link 107 the power of transceiver 103. In particular the power is used for a sending part 103a or an uplink within the transceiver 103.

The PSD or P is calculated according to the formula $$P = NRT + N - g$$

This may be a power value used for transmitting data from the Sending Device 102 within transceiver 103.

The calculation for the PSD value may include a calculation used for Interference Constraint Power Control (ICPC).

The transceiver 103 can use the PSD value received from Calculating Device 105 for controlling in an uplink direction 103a the transmitting power, i.e. from sending part 103a of transceiver 103 to a BTS to which the MS 100 is connected. The BTS is not shown in FIG. 1. The transceiver 103 may use OFDM which comprise multiple orthogonal resource units which are defined in the frequency domain based on Orthogonal Frequency Division Multiplexing Access (OFDMA) according to the standard IEEE 802.16m.

The resource units, resources, or resource blocks can be allocated to multiple users (UEs) at the same time with each user being allocated to one or more resource blocks. In other words, transceiver 103 can use a plurality of resource blocks for a data transmission from Sending Device 102 via transmitting part 103a of transceiver 103 via antenna 104 to a corresponding BTS. The MS 100 can be connected to the corresponding BTS by which connection an association between the MS 100 and the corresponding BTS may be made. In an example the MS 100 may be associated with a BS or BTS having the strongest receiving power level at the location of the MS. The associated BTS may define or generate a cell, sector or site and the BTS, to which the UE 100 is connected may define the serving sector, the serving cell or the serving site.

The Load Factor Determining Device 106 may be adapted to extract a load factor information from a broadcast channel. In order to detect a corresponding load factor information, a corresponding message format may be detected within a signal sequence. Thus, the signal sequence can be modulated according to the message format. In particular the header of a corresponding message may be detected. The corresponding message may be a PBCH information message or a PBCH information element (IE). The message may be defined in the IEEE standard 802.16 or 802.16m. The transceiver 103 in particular the receiving part 103b of transceiver 103 or the Determining Device 106 allow to determine or to detect corresponding message formats within a signal sequence. The signal sequence may be a modulated electro magnetic wave.

Figure 2:
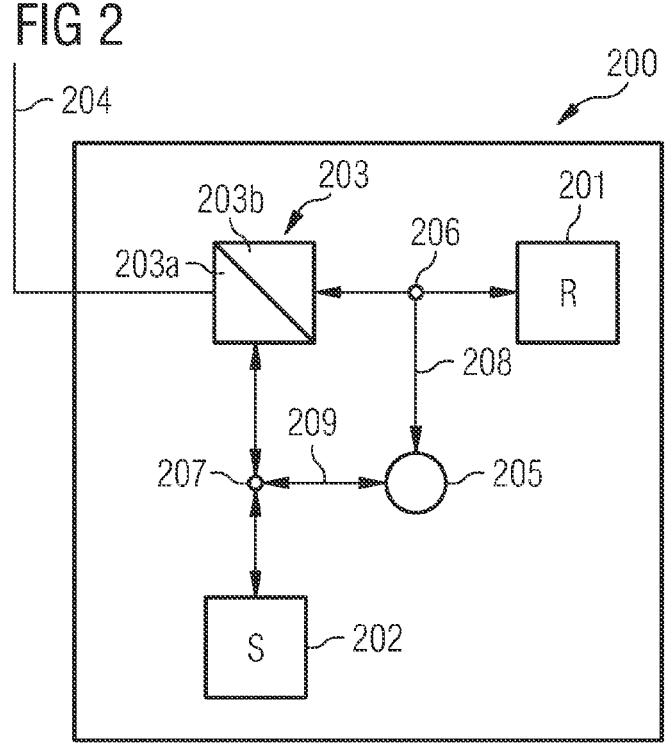
FIG. 2 shows a block diagram of a Network Apparatus for maintaining a sector according to an exemplary embodiment of the present invention.

FIG. 2 shows a Network Apparatus for maintaining a sector according to an exemplary embodiment of the present invention.

The Network Apparatus 200, the BTS 200 or BS 200 comprises the transceiver 203, the Receiving Device 201 and the Sending Device 202. Receiving Device 201 may prepare received data for further processing within Network Apparatus 200 and Sending Device 202 may prepare data for sending via transceiver 203. Furthermore connected to transceiver 203 is antenna 204, which allows transmitting and/or receiving data from/for BTS 200. The BTS 200 further comprises the Sector Load Factor Determining Device 206. The Sector Load Factor Determining Device may processes or detects the number of used resources within a sector, within a site or within a cell maintained by the BTS 200. In OFDM the BTS 200 can use a plurality or multiple orthogonal resource units for exchanging data with a corresponding MS. The MS or UE is not shown in FIG. 2.

The Sector Load Factor Determining Device in an example is integrated into a bidirectional communication link between Receiving Device 201 and receiving part 203b of transceiver 203. Via the link 208 the Sector Load Factor Determining Device may be connected to a Transmitting Device 205, in particular to a Sector Load Factor Value Transmitting Device 205. The Transmitting Device 205 is adapted to use the sector load factor determined by the Sector Load Factor Determining Device 206 in order to calculate load factor values corresponding to the sector or site defined by the Network Apparatus 200, BS 200 or BTS 200.

The Network Apparatus 200 can be adapted to communicate with another Network Apparatus 200. Thus, a plurality of Network Apparatuses 200 may be able to exchange the load factor values of the sectors. A BS in an example has three sectors. If a BS 200 in one sector is connected to a MS and the same BS 200 broadcasts the load factor values of other neighbour sectors to the MS, the other sectors can be co-site sectors.

The BS 200 can comprise BTSs 200 which define the sectors or site of the BS 200. A sector, in particular the shape or the footprint of the sector may depend on the type of antenna 204. For example, if antenna 204 may be a directional antenna 204 the site or cell may be a sector. In another example antenna 204 may be an omni-antenna, which allows to maintain a site or sector having substantially a circular form.

Calculated or determined power load values, for example a may be transmitted via bidirectional link 209 to a Channel Preparation Device 207. In Channel Preparation Device 207 the power factor value calculated by Transmitting Device 205 or by Site Load Factor Determining Device 206 is integrated into a predefined channel, for example a broadcast channel or a control channel or a management channel. The Channel Preparation Device 207 may generate the message format in order to transmit a corresponding signal sequence via antenna 204.

Via the sending part 203a of transceiver 203 the calculated or generated sector load factor value is transmitted in parallel to the prepared transmission data from Sending Device 202. In an example channels used for data transmission may be separated from a channel used for the load factor value. In an example the Transmitting Device 205 generates a message in a signal sequence which signal sequence can be transmitted via transmitting part 203a of transceiver 203. The Channel Preparation Device 207 combines the data from Sending Device 202 and the load factor value from the Transmitting Device 205.

The BTS 200 determines or generates only one single load factor value, which may be associated with the sector defined by the BTS 200.

Figure 3:
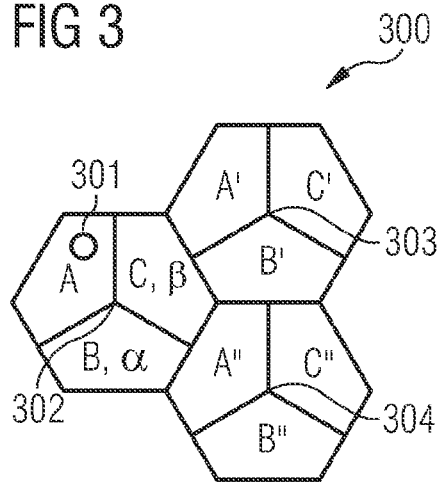
FIG. 3 shows a block diagram of a cellular network structure according to an exemplary embodiment of the present invention.

FIG. 3 shows a block diagram of a cellular network structure according to an exemplary embodiment of the present invention.

The network shown in FIG. 3 is an extract of a regular structured, e.g. hexagonal structured, theoretical wireless communication network. In a practical example, the sites or cells shown as regular structures within FIG. 3 may have a different form, wherein the form depends on the physical conditions such as fading effects, reflections or the type of environment such as concrete or grass.

The network 300 comprises nine sectors A, B, C, A', B', C', A", B", C" or cells generated by three BSs 302, 303, 304. Each BS comprises three BTS which generate the sectors, sites or cells A, B, C, A',B', C', A", B", C". A cell can be a site or a sector, in particular a cell comprises 3 sectors. The first BS generate the first sectors A, B, C, the second BS 303 generates the second sectors A', B', C' and the third BS 304 generates the third sectors A", B", C". In other words, a cell has a BS 302, 303, 304 which is located at one site. A cell comprises of 3 sectors A, B, C, A', B', C', A", B" and C". A site can mean the location of BS 302, 303, 304. Thus, in an example a site may define a location of a sector.

The BTS A, BTS B, BTS C may be located at the location of the BS. But the BTS A, B, C can use directional antennas in order to define a sector.

In FIG. 3, the MS 301 or UE 301 is associated with BTS A defining sector A. BTS C defining sector C or site C and BTS B, defining site B or sector B are not associated with MS 301.

In order to maximize a spectral efficiency a frequency reuse factor of 1 is desired for both downlink and uplink connections within one sector A, B, C. A spectral efficiency may be calculated by dividing the total available bandwidth by the data rate. In an example the total available bandwidth of 5 MHz and a data rate of 10 Mbit/s is used therefore a spectral efficiency is 2 bit/Hz. With a frequency reuse factor of 1, data in control channels in one sector A, B, C, will experience interference from other sectors or cells.

In other words, if sectors A, B, C, A', B', C', A", B", C" use substantially the same frequency or substantially the same frequency band, a transmission from MS 301 to BTS A will interfere a transmission from a MS located inside sector C to BTS C or a transmission of an MS located inside a sector B to BTS B. Therefore, an MS transmit power can be controlled such, to compensate a path loss without generating too much interference to neighbour sectors or neighbour cells.

For example, if data is sent from MS 301 to BTS A, it is desired to compensate a path loss between BTS A and MS 301. Therefore, MS 301 uses a transmit power which already considers the path loss in order to provide the BTS A with a high receiving power and thus, a high receiving quality.

However, sending data with a compensated path loss power from MS 301 to BTS A may interfere communications of MSs located in neighbour cells C, B, A', B', C', A", B" and C".

A path loss based uplink (UL) power control in an example may be used in LTE. In such a path loss based UL power control an MS estimates the received power of the downlink (DL) preamble from a serving sector.

In the example of FIG. 3 MS 301 uses a preamble sent by BTS A to estimate the path loss between MS 301 and BTS A. With the knowledge of the BS 302 or BTS A transmit power level, the MS 301 can estimate the path loss including interfering, shadowing and antenna gains. The BTS A may include in a message sent to the MS 301 the BS transmit power level. The path loss may be indicated with L or PL.

The MS 301 which has the described values can calculate an uplink transmit power per subcarrier or a power spectrum density which is obtained according to the formula:

$$PSD = SINR_T + IoT + Noise + \alpha \cdot PL$$

In this formula, $SINR_T$ (Signal to Interference plus Noise Ratio) is desired SINR or is the target SINR. In other words, $SINR_T$ is the target SINR of the uplink signal. IoT is the interference rise over thermal levels. This value indicates the level of interference as estimated and it reflects the current interference level of current sector.

"Noise" indicates the thermal noise per subcarrier or per resource unit or per resource block. $\alpha$ is the path loss compensation factor designated by the BS. With the path loss compensation factor the BS or BTS A indicates to the MS 301 which fraction of the path loss may be compensated by the MS. In a case where $\alpha<1$, substantially a fraction of the path loss is compensated. This kind of power control may also be called fractional power control.

Pure fractional power control only considers the serving cell A.

A load awareness interference constraint power control or L-ICPC may allow taking into account the level of interference that the UE 300 or MS 300 creates in other cells A', A", B, B', B", C, C', C". With L-ICPC MS 301 with similar path gain can be considered. UEs with similar path gain can have very different strengths as interference sources for other sectors. The strength of interference may depend on a path loss to surrounding sectors, such as C, B, A', A".

Furthermore L-ICPC (Load aware Interference Constraint Power Control) may allow controlling the noise rise at the Base Station. BS may estimate received interference and then calculate the noise raise level which the BS can accept at the BS site.

An enhanced fractional power algorithm may consider the interference to other sectors as well as the target SINR to the serving sector A. Such fractional power algorithm may focus on using a path gain to the second strongest sector. The serving sector A for a MS 301 commonly is the strongest sector. This path gain of the second strongest sector is used as a value to calculate the transmitting power.

The L-ICPC or load aware ICPC algorithm may consider that a second strongest path gain may be a very weak path gain. An L-ICPC algorithm may also consider that there might not be a dominant path gain to the non-serving sectors B, C, A', A". In an example, fast fading could make a second strongest path gain to obscure or to be hidden.

The L-ICPC algorithm transmits the value and thus prevents determining the interference to other sectors. It can be complex to obtain the second strongest path gain. The MS 301 may have to obtain a received signal strength of corresponding preamble of all neighbour sectors or of all neighbour cells C, B, A',B', C', A", B",C" and then to sort them. The sorted values have to be investigated in order to find the second strongest path gain. This can be a complex calculation and a time-consuming process, which can be prevented by using L-ICPC and thus, L-ICPC may allow saving resources such as calculation power or processing capacity within the MS 301. This may allow manufacturing less complex MSs and may allow producing less expensive MSs.

In another example, an interference constraint power control (ICPC) exists, which algorithm has as target, to consider an interference level to other sectors, instead of focusing to a certain SINR. In order to estimate the interference level for given transmit power, the sum of path gain to all other sectors is used.

An enhanced fractional power control considers the interference to the sector having the second strongest path gain, i.e. to one of the neighbour sectors, as well as targeting to the SINR of own link or at the serving BTS.

Considering the interference to other sectors as it may be done during an enhanced fractional power algorithm in a particular example may be the same as targeting to a certain interference level as of ICPC.

In ICPC, the transmit uplink power spectrum density (PSD) or power spectral density is obtained as, $$PSD = NRT + Noise - g$$

In this formula, PSD is the transmit power density, i.e. the transmit power per subcarrier which may be controlled by Calculating device 105. Noise is the thermal noise power and g is calculated as $$g = \sum_{i=1}^{all} g_i$$

which is the sum of all path gains from an actual MS 301 to all other sectors B, C, A', A". In this case, "all" may mean all determined, visible or received sectors, which means all sectors whose power level is over a certain threshold. NRT is the target noise rise level designated or desired by the BS. In other words, NRT indicates how much noise is allowed by the MS.

Noise rise=(N+I)/N, wherein N is the received UL and I is the interference, desired by the BS. Noise rise may be another name for IoT and therefore, IoT may also equals to (N+I)/N.

Generally, if not otherwise indicated, values used in this text may be considered as being in decibel or dB. Thus, PSD, NRT, noise, g are considered to be in dB.

Calculating the sum of all path gains, in particular calculating the sum of all received path gains may be simpler compared to calculating the second strongest path gain.

The sum of path gains g is calculated as $$g = (P-N)/Txp - PG$$

In this formula P is the total received power from all BTS detected by using corresponding preambles which preambles are individual for each BTS. N is the noise power, which can be a fixed value defined in a specification. Txp is the transmitting power of the corresponding BS. PG is the path gain from MS 301 to the serving BS, BS A or BTS A.

Simulations may show that ICPC can increase the sector throughput and stabilize the noise rise level of different BS. The performance of ICPC may be increased by considering the load information of different sectors B, C, A', B', C' A", B", C".

When a neighbouring sector B, C isn't in full load, the interference level is less than in a full load scenario from a long-term point of view. This information can be used to improve the system performance by considering load. In other words, knowing that a neighbouring sector may not use all available resources may allow using a higher transmitting power in upload direction and thus may resulting in a better signal quality. The usage of the resources may be transmitted in a corresponding message comprising the load factor values.

ICPC uses as indicated above the following equation to decide the MS 301 Tx power:

$$PSD = P = NRT + N - g$$

In this equation g now is the equivalent path gain instead of $$g = \sum_{i=1}^{\infty} g_i \text{ or } g = \sum_{i=1}^{all} g_i$$

"All" in this formula may mean all other sectors, e.g. co-site sectors, neighbour cell sectors etc. One load factor or load factor value may correspond to one sector. The value of g now is calculated in a case of two co-site sectors or two neighbouring sectors B, C as $$g = \alpha 10^{\wedge}\left(\frac{g_1}{10}\right) + \beta 10^{\wedge}\left(\frac{g_2}{10}\right) + \sum_{k=3}^{\infty} 10^{\wedge}\left(\frac{g_k}{10}\right)$$

In this formula, $g_1$ and $g_2$, respectively are the path gain to co-site sectors B, C of the serving sector A. In other words, $g_1$ may be the path gain from MS 301 to BTS C as calculated by MS 301 using preamble of BTS C and $g_2$ may be the path gain calculated by the MS 301 to BTS B. α and β are broadcasted by the sectors B, C. In an example, co-site sector B broadcasts the load power factor value α and the co-site sector C broadcasts the power factor value β. The load factor values α, β are the load information of two co-site sectors or of two neighbouring sectors on a particular frequency band. In the example there are three co-site sectors A, B, C. α is the load information of sector B, and β is the load information of sector C, sector A is the serving sector.

In an example a simulation is made for comparing different power control algorithm. In this simulation assumptions as defined in Table 1 are made.

TABLE 1

| Parameter | Value | Note |
|---|---|---|
| System bandwidth | 10 MHz | |
| RU | 180 kHz | Total 50 RUs |
| Number of Rus per UE | 5 RUs | |
| Number of Ues per sector | 10 | |
| Scheduling algorithm | PF | |
| PC Period | 500.0 ms | |
| TTI | 1.0 ms | |

TABLE 1-continued

| Parameter | Value | Note |
|---|---|---|
| Slow fading, std. dev | 8.0 dB | Slow fading is updated every 100 ms. Correlated distance is 50 m. |
| Use fast AMC | Yes | MCS is selected every TTI |
| ISD | 500 m | |
| Penetration loss | 20 dB | |
| UE speed | 3 km/h | |
| UE Max power | 25 dBm | |
| UE Min power | −15 dBm | |

Thus, the system bandwidth is assumed as being 10 MHz. RUs (Resource Units) are assumed as to be a bandwidth of 180 kHz and in total 50 RUs are used. The number of RUs used per UE 301 or MS 301 are 5 RUs. The number of UEs available per sector A, B, C, are 10. As scheduling algorithm, the packet scheduler PF (Proportional Fair, which may describe a scheduling algorithm) is used.

The PC (Power Control) period is assumed as 500.0 ms. The TTI value (Transmission Time Interval) is 1.0 ms. Slow fading, std.def (standard derivation) is assumed as 8.0 dB. Slow fading is updated every 100 ms. The correlated distance is 50 m.

The fast AMC algorithm is used and MCS is selected every TTI. AMC may be a permutation method as defined in IEEE 802.16e. MCS may be a modulation and coding scheme.

Figure 4:
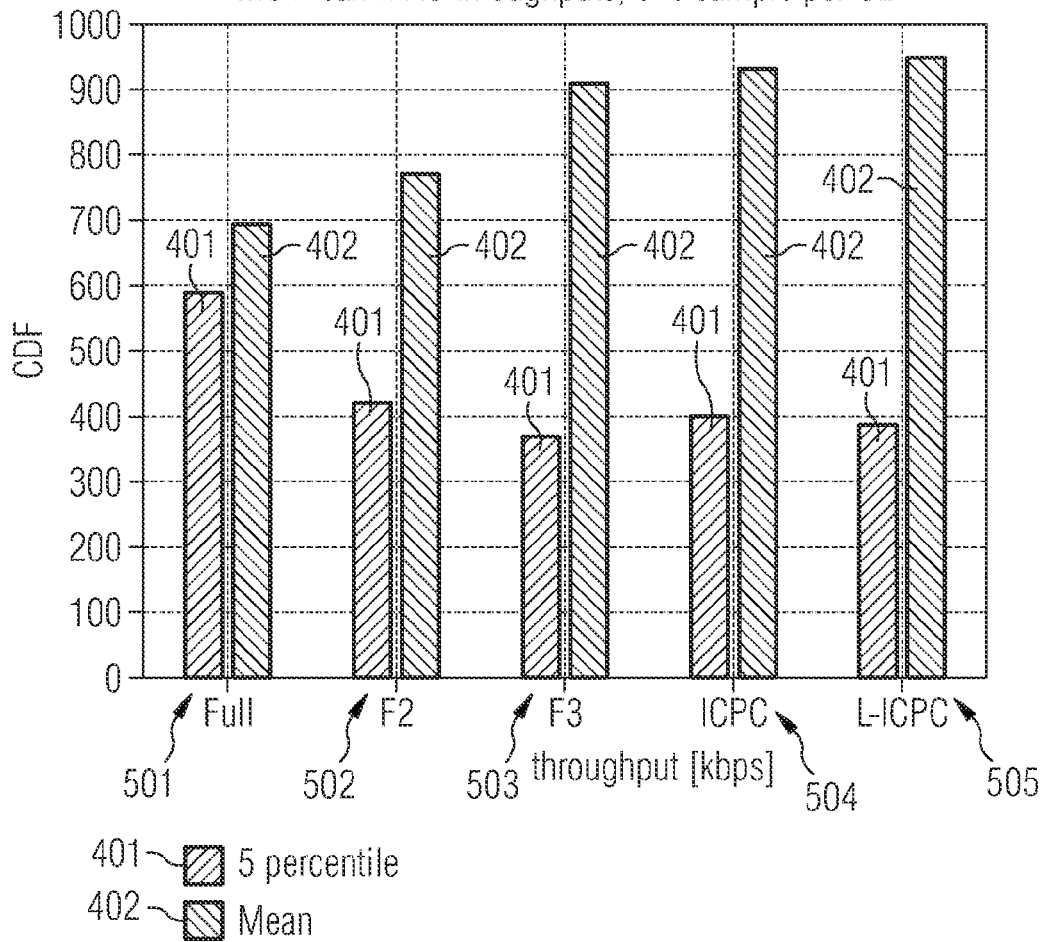
FIG. 4 shows a diagram for MS mean MAC throughput according to an exemplary embodiment of the present invention.
Figure 5:
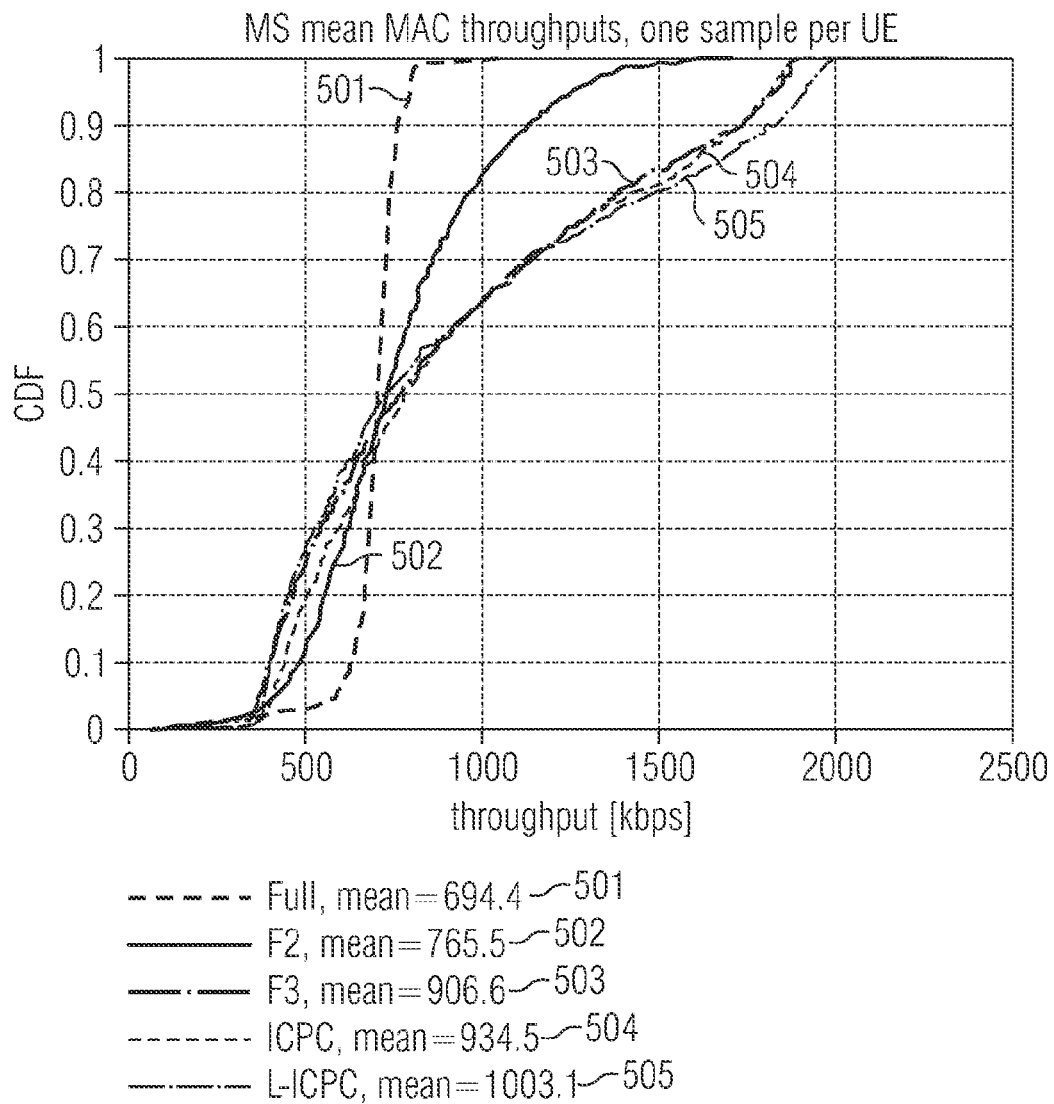
FIG. 5 shows another diagram for MS mean MAC throughput according to an exemplary embodiment of the present invention.

The intersection distance between BS 302, 303, 304 (ISD) is 500 m. The penetration loss is 20 dB and the UE 301 speed is 3 km/h. The UE 301 max power is 25 dBm and the UE min power is −15 dBm. 5 simulation cases have been conducted. The results of the simulation are indicated in FIGS. 4 and 5. The first simulation case 501 shows a full compensation of path loss:

$$PSD = SINR_T + IoT + Noise + PL$$

The second case 502 shows fractional power control (F2):

$$PSD = SINR_T + IoT + Noise + \alpha \cdot PL$$

The third case shows an enhanced fractional power control (F3) 503:

$$PSD = SINR_T + IoT + Noise + \alpha \cdot (PL_{2nd} - PL) + PL$$

The fourth simulation case shows interference constraint power control (ICPC) 504:

$$PSD = NRT + Noise - g$$

where $$g = \sum_{i=1}^{all} g_i$$

The fifth simulation 505 case shows a load awareness fractional power control (L-ICPC)

$$PSD = NRT + Noise - g$$

where $$g = \alpha 10^{\wedge}\left(\frac{g_1}{10}\right) + \beta 10^{\wedge}\left(\frac{g_2}{10}\right) + \sum_{k=3}^{\infty} 10^{\wedge}\left(\frac{g_k}{10}\right)$$

In an example, load awareness ICPC (L-ICPC) 505 can achieve rough 8% gain on sector throughput over ICPC.

FIG. 4 shows a diagram for MS mean MAC throughputs according to an exemplary embodiment of the present invention.

In the diagram shown in FIG. 4 the mean MAC (Media Access Control) throughput in kbps for the different simulation cases 501, 502, 503, 504, 505 is shown.

The mean MAC throughput may be the throughput on layer 2 of the OSI model.

In the simulation one sample per UE is used, i.e. one value for one MS/UE is taken and all the values are statistically evaluated.

For every simulation case 501, 502, 503, 504, 505 the 5 percentile value 402 and the mean value 401 can be calculated. 5 percentile or edge user throughput is a level, which represents the cell edge throughput, which is defined as the 5% users with worst user throughput.

On the abscissa of the diagram of FIG. 4 the throughput or goodput in kbps is shown and on the ordinate the cumulative density function (CDF) is shown. The FIG. 4 shows that L-ICPC achieves the highest throughput in kbps.

FIG. 5 shows another diagram for MS mean MAC throughput according to an exemplary embodiment of the present invention. The mean value of MS throughput is listed in the figure too. The diagram in FIG. 5 shows the CDF values (Cumulative Density Values) and FIG. 5 confirms the results of FIG. 4 that the probability to reach higher throughput values with L-ICPC 505 is higher then with other methods 501, 502, 503, 504. The curve 505 associated with L-ICPC reaches values of up to 2000 kbps.

The mean throughput or goodput for Full 501 is 694.4, for F2 765.5, for F3 906.6, for ICPC 934.5 and for L-ICPC 1003.1.

Figure 6:
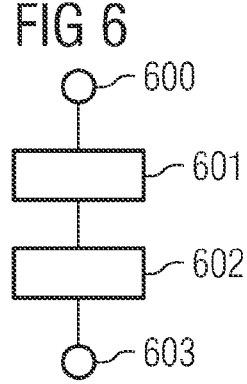
FIG. 6 shows a flow-chart of a method for determining a transmit power for a load awareness control of a User Equipment Apparatus according to an exemplary embodiment of the present invention.

FIG. 6 shows a flow-chart of a method for determining a transmit power for a load awareness control of a User Equipment Apparatus according to an exemplary embodiment of the present invention.

In step 600 the method starts in an idle mode and in step 601 at least one load factor value of a neighbour sector or at least one neighbour sector is determined. In step 602 a transmit power of the User Equipment Apparatus is calculated such that the at least one load factor value of the co-site sector is considered.

In step 603 the method is again in the idle mode.

Figure 7:
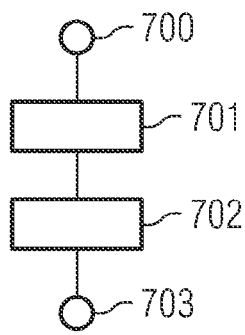
FIG. 7 shows a flow-chart of a method for providing a load factor of a site for load awareness power control according to an exemplary embodiment of the present invention.

FIG. 7 shows a flow-chart of a method for providing a load factor of a sector for load awareness power control according to an exemplary embodiment of the present invention.

In step 700 the method starts in an idle mode. In step 701 at least one load factor for the site is determined and in step 702 the at least one determined load factor value is transmitted, for example in a broadcast channel. In step 703 the method ends in an idle mode.

FIG. 8 shows a message format according to an exemplary embodiment of the present invention.

The message format comprises three columns wherein in the first column the syntax is provided, in the second column the size and in the third column a node is provided.

In an example the message is called PBCH information. The message or information element comprises a superframe number, which has the size of 8 bits.

As another parameter an SBCH size (Secondary Broadcast Channel size) may be contained in the primary broadcast channel (PBCH) information message. The SBCH size may be expressed with 3 bits. The SBCH size is provided in units of LRU. LRU stand for Logical Resource Unit, a terminology used in IEEE 802.16m for OFDM Resource Blocks.

The next parameter may indicate a duplex mode which has the size of 1 bit and the value of 0 may indicate TDD (Time Division Duplex) and the value of 1 means FDD (Frequency Division Duplex) or HFDD (Half duplex FDD).

If the duplex mode is selected as 0, which means TDD, a TTG (Transmit/receive Transition Gap) parameter may be provided. TTG uses 2 bits and the TTG provides the TTG size in units of OFDM symbols. 00 means no TTG. 01 means a single OFDMA symbol is used for TTG. The bit pattern 10 indicates that two OFDMA symbols are used for TTG and the bit pattern 11 is a reserve.

As a next three bit parameter a DL/UL ratio is provided. The bit pattern 000 indicates that four DL sub-frames and four UL sub-frames are used. The bit patterns 001, 010, 011 and 100 indicate ratios of 5:3, 5:2, 7:1 and 8:0, respectively. Other bit patterns are reserved.

If not a duplex mode is selected, an UL central frequency parameter of 5 bits is provided in the PBCH information message, wherein UL central frequency indicates a paired UL central frequency. Central frequency is the centre of the frequency band.

For FDD, UL and DL different central frequency can be used. The MS has to know UL central frequency for ranging.

A DL bandwidth of 2 bits is provided wherein the bit patterns 00, 01, 10 may be used for 5 MHz, 10 MHz, 20 MHz, respectively.

A physical configuration counter of 4 bits is provided which should or could be common in the whole network, whenever physical configuration is changed.

As another parameter a paging information presence parameter comprising 1 bit is provided which indicates the presence of paging information in the channel of SBCH.

A traffic indication presence parameter of 1 bit is provided which indicates the presence of the traffic indication in the channel of additional broadcast information.

A load factor of neighbouring sectors is provided, which comprises 8 bits. The load factor of neighbouring sectors indicates the load factor or load factor value of neighbouring sectors. Supposed that the current sector index is i or the serving sector index is i this is the index within one cell. The values 0–2 means the 3 sectors A, B, C within a cell. The most significant four bits indicate the load factor of sector [i+1] mod 3 and the lowest significant four bits indicate the load factor of sector [i+2] mod 3. bits 0000 means the load factor=0, and bits 1111 means load factor=1, the step size is $\frac{1}{15}$.

In an example an existing control message or broadcast massage may be extended with load factor bits of neighbouring sectors.

The last parameter is PBCH CRC value of 16 bits which is a cyclic redundancy check for the PBCH information message.

Thus, a modified power control scheme based on ICPC (Interference Constraint Power Control) power control may be provided. The modified power control scheme can be used in IEEE 802.16m.

To maximize the spectral efficiency, frequency reuse factor of one is proposed for both downlink and uplink. With frequency reuse factor of one, data and control channels in one sector will experience interference from other sectors/cells. MS transmit power may be controlled to compensate path loss without generating too much interference to neighbour sectors/cells.

Pathloss based UL power control may be considered for LTE. Where, MS estimates the received power of the downlink (DL) preamble from serving sector and with knowledge of the BS transmit power level can then estimated path loss (including shadowing and antenna gains).

It should be noted that the term "comprising" does not exclude other elements or steps and the "a" or "an" does not exclude a plurality. Also elements described in association with different embodiments may be combined.

It should also be noted that reference signs in the claims shall not be construed as limiting the scope of the claims.

The invention claimed is:

1. An apparatus comprising
at least one processor; and at least one memory including computer program code, the at least one memory and the computer program code configured to, with the at least one processor, cause the apparatus to perform at least the following:
to determine at least one load factor value of a neighbour sector; and
to calculate a transmit power of the apparatus such that the at least one load factor value of the neighbour sector is considered, where calculating the transmit power comprises determining a power density based on a target noise rise level, noise power and a weighted gain, and
where the weighted gain is based at least in part on the at least one load factor value of the neighbour sector.

2. The apparatus of claim 1, wherein the transmit power is an uplink transmit power.

3. The apparatus of claim 1, wherein, when determining at least one load factor value, the at least one memory and the computer program code are further configured with the at least one processor to cause the apparatus to receive a load factor value.

4. The apparatus of claim 1, wherein, when calculating the transmit power, the at least one memory and the computer program code are further configured with the at least one processor to cause the apparatus to weight a path gain to the neighbour sector with the corresponding at least one load factor value.

5. The apparatus of claim 1, wherein the at least one load factor value corresponds to an average load of the neighbour sector.

6. The apparatus of claim 1, wherein the at least one load factor value corresponds to scheduling information of at least one of a resource block, an orthogonal frequency division multiplex resource block and a sub-carrier.

7. The apparatus of claim 1, wherein the apparatus is at least one apparatus of:
a global system for mobile communication user equipment,
a universal mobile telecommunications system user equipment,
an long-term evolution/service architecture evolution user equipment,
a mobile terminal,
an IEEE 802.16m advanced mobile station and
a mobile station.

8. A method comprising:
determining a transmit power for a load awareness power control of a user equipment apparatus, the method comprising:
determining, by the user equipment apparatus, at least one load factor value of a neighbour sector;
calculating, by the user equipment apparatus, a transmit power of the user equipment apparatus such that the at least one load factor value of the neighbour sector is considered, where a load factor value of a sector comprises a number of devices being served in the sector.

9. The method of claim 8, further comprising:
determining a weighted gain, g, such that:

$$g = \sum_{k=1}^{\infty} n_k \times 10^{\wedge}\left(\frac{g_k}{10}\right),$$

where k represents a number of detectable neighbour sectors, $n_k$ is the load factor of a given sector k and $g_k$ is the gain of the given sector k.

10. The method of claim 8, where the neighbour sector is a co-site sector of a cell serving the User Equipment Apparatus.

11. The method of claim 1, where a load factor value of a sector comprises a number of devices being served in the sector.

12. The method of claim 8, where a load factor value of a sector comprises a number of used resources in the sector in relation to a number of available resources in the sector.

13. The method of claim 8, further comprising:
obtaining received signal strengths of a plurality of sectors, where the plurality of sectors comprises the neighbour sector;
sorting the received signal strengths; and
determining a second strongest path gain based on the sorted received signal strengths.

* * * * *